Dec. 15, 1925.

J. HERMAN

MEANS FOR REGULATING MOTORS

Filed Sept. 5, 1923

1,565,325

INVENTOR
J. Herman
BY
ATTORNEY

Patented Dec. 15, 1925.

1,565,325

UNITED STATES PATENT OFFICE.

JOSEPH HERMAN, OF NEW YORK, N. Y., ASSIGNOR TO AMERICAN TELEPHONE AND TELEGRAPH COMPANY, A CORPORATION OF NEW YORK.

MEANS FOR REGULATING MOTORS.

Application filed September 5, 1923. Serial No. 661,059.

*To all whom it may concern:*

Be it known that I, JOSEPH HERMAN, residing at New York, in the county of New York and State of New York, have invented certain Improvements in Means for Regulating Motors, of which the following is a specification.

This invention relates to automatic controlling arrangements, and more particularly to arrangements for controlling the operation of electrical machinery such as motors and dynamos.

It is one of the objects of the invention to provide an automatic arrangement for governing the speed of a direct current motor. It is another object of the invention to provide an automatic arrangement for maintaining constant the frequency generated by an alternating current generator, whether the generator be of the single frequency or multi-frequency type. Another object of the invention is to provide means for controlling the speed of rotation of a motor generator set, the control being effected in such a manner as to maintain a definite relationship between the speed of rotation of the motor of the set and the frequency of some auxiliary constant frequency device such, for example, as a tuning fork.

These objects, as well as other objects of the invention, are attained by providing a commutator arrangement operated by the motor, the commutator being so connected with the electrical elements of the motor that, when operated, it will produce cyclic changes in the electrical constants of the motor. For example, it may be arranged to successively short-circuit a resistance in the field winding of the motor. A mechanically operated tuning fork is provided with a contact arrangement which is connected with the commutator in such a manner that, when the rotation of the commutator bears the proper relation to the frequency of vibration of the tuning fork, the successive periods during which the resistance is short circuited will be of normal duration. As the speed of the motor changes, however, the frequency relationship between the commutator and the tuning fork will be changed in such a manner as to make the periods during which the resistance is shortcircuited longer or shorter, as the case may be.

Figure 1:
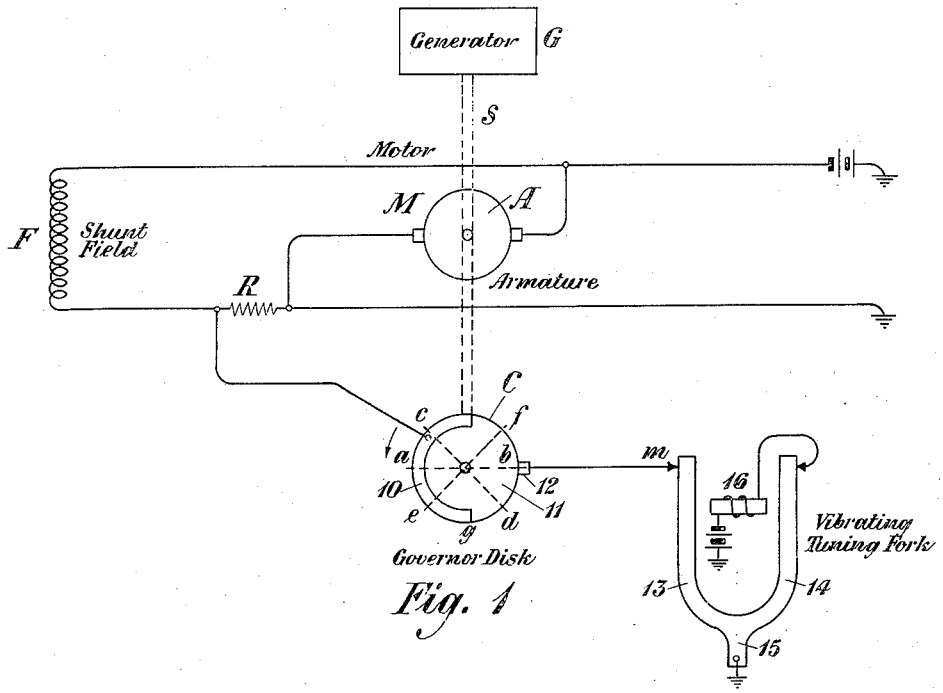
Figure 2:
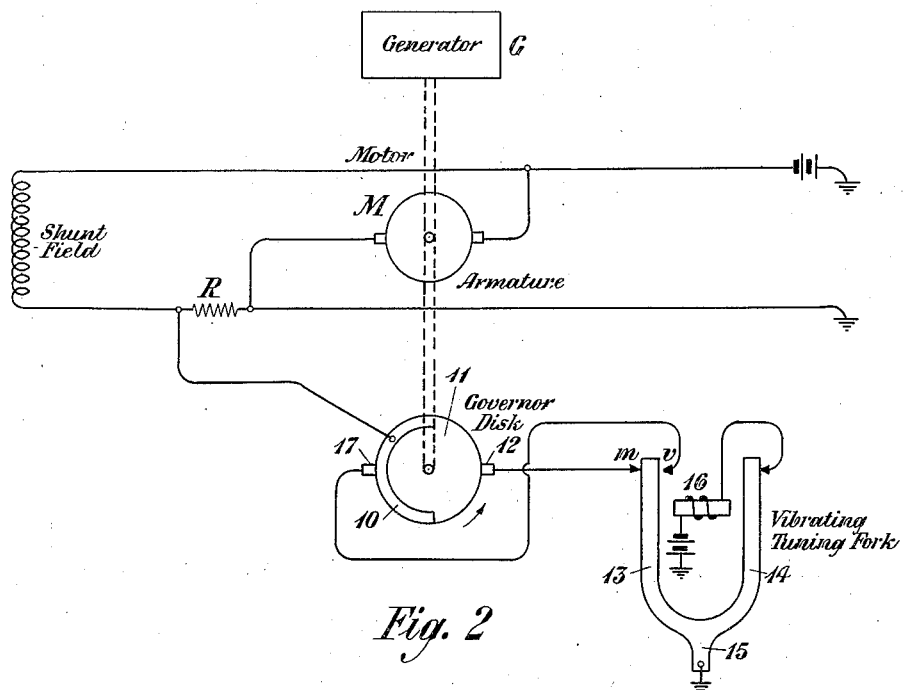

The invention may now be more fully understood from the following description when read in connection with the accompanying drawings, Figures 1 and 2 of which illustrate two different embodiments of the invention.

Referring to Fig. 1, M designates the motor of a motor generator set, the generator of the set being schematically indicated at G. This generator may be either a single frequency or a multi-frequency generator without departing from the principles of the invention. The motor M comprises an armature A and field winding F connected in shunt with the armature A in the usual manner. In series with the field winding is a resistance R. Upon the shaft S by means of which the motor M drives the generator G, a commutating device C is mounted. This commutator comprises a conducting segment 10 connected to one terminal of the resistance R, a non-conducting segment 11, and a brush 12 connected to a contact $m$ of the mechanically vibrated tuning fork.

The mechanically vibrated tuning fork is of a type well known in the art, comprising vibrating arms 13 and 14 carried by a stem 15 which is grounded as shown. A contact on the arm 14 is connected to a controlling electromagnet 16, the winding of which is in series with an energizing battery. Such an arrangement, as is well known, will, when set into operation, continue vibrating at a constant frequency determined by the natural period of the tuning fork proper and by the electrical constants of the circuit of the electromagnet. The tuning fork is so designed that its frequency of vibration in cycles per seconds bears a definite relationship to the number of segments passing a given point per second when the motor is running at the desired speed. As illustrated in the drawing, the commutator contains but one segment and since it is mounted directly on the motor shaft, the frequency of the tuning fork must be the same as the desired speed of the motor. By gearing the commutator to the motor shaft with a suitable gear ratio, it will be obvious that other relationships between the frequency of the fork and speed of the motor may be employed.

To illustrate the operation of the arrangement, assume that the motor is running in synchronism with the fork. Whenever the fork operates to close the contact $m$, the point designated $b$ on the commutator disc is in contact with the brush 12. The arm 13 of the tuning fork remains in contact with the element $m$ during the time that the commutator makes half a revolution or until the point $a$ on the commutator makes contact with the brush 12. The shunt field resistance R, which is connected to the segment on the commutator, is therefore shortcircuited through the segment 10, brush 12, contact $m$ and the ground connection to the stem 15 of the tuning fork, while the portion $a$—$g$ of the segment passes the brush 12. This occurs during each revolution of the commutator, the resistance R being of such value that the motor M will run at the desired speed if the resistance is shortcircuited during the period of contact ($a$—$g$) which is a quarter of each revolution.

If the speed of the motor tends to increase, the phase relationship between the disc and the fork will change so that the point $d$, for example, will replace the point $b$ with respect to the brush 12 at the instant the arm 13 of the fork makes contact with $m$. Consequently, the resistance R will be shortcircuited during the portion ($c$—$g$) of a revolution. The resistance R is, therefore, shortcircuited during a longer period than previously described, so that the motor will tend to slow down and the disc will assume a phase relationship with respect to the vibration of the fork such that the motor will maintain the same speed as before.

Similarly, if the speed of the motor tends to fall below normal, point $f$ will replace the point $b$ of the commutator at the instant contact $m$ is closed by the tuning fork, and the resistance R will be shortcircuited only during the portion ($e$—$g$) of a revolution, thereby causing the motor to speed up.

With the arrangement above described, the range of speed over which the governing will take place is relatively small as the change in speed will be due to an effective change in the resistance of the field winding varying between the total value of resistance R and half the total value of resistance R. That is, if the tuning fork and commutator are sufficiently out of synchronism in one direction, the resistance R will not be shortcircuited at all and the full value of the resistance will be included in the field winding. On the other hand, if the tuning fork and commutator are sufficiently out of synchronism in the other direction, the resistance R will not be shortcircuited during more than one half a revolution, which is equivalent to reducing the average resistance in the field winding to half its total value.

Fig. 2 illustrates a circuit arrangement which will have double the range of speed regulation obtained by that of Fig. 1, or, in other words, an effective change in the resistance of the field from the full value of R to zero. This change is effected by providing an extra contact $v$ for the arm 13 of the tuning fork as indicated, this contact being connected to an additional brush 17 upon the distributor, this brush being 180° out of phase with the brush 12.

The operation is as follows: When the vibrating arm 13 of the tuning fork closes the contact $m$ with the apparatus operating in synchronism, the relative positions of the brushes 12 and 17 with respect to the segment 10 will be as indicated in the diagram. Under this condition, the shortcircuit about the resistance R is opened. After a quarter-revolution of the distributor, the segment 10 passes under the brush 12 and closes the short circuit, this shortcircuit remaining closed until the end of another quarter-revolution when the arm 13 of the tuning fork will have shifted to contact $v$. The short circuit is now again opened at contact $m$ and remains open for another quarter-revolution when the segment 10 passes under the brush 17, again closing the short-circuit which remains closed for another quarter-revolution, after which the arm 13 again shifts to contact $m$ and the apparatus will be in the condition illustrated in the drawing. It will thus be apparent that the shortcircuit is closed during two intervals of a revolution for a total time equal to that required for one-half revolution of the distributor. In other words, the effective resistance of the resistance element R is reduced to one-half its full value in the normal synchronous operation of the circuit.

If the speed of the motor tends to increase, the segment 10 will be closer to the brush 12 at the instant the contact at $m$ is made by the tuning fork. Consequently, the interval during which the short circuit is opened is shorter and the interval during which it is closed is longer and in the limiting case, where the segment will have just made contact with the brush 12 at the instant the arm 13 makes contact with $m$, each of the two periods during which the short circuit is closed for each revolution will extend throughout the duration of a half-revolution so that the short circuit under these circumstances is closed during the complete revolution. The entire resistance of the element R is accordingly eliminated from the field circuit. This tends to slow down the speed of the motor.

If, upon the other hand, the motor tends to slow down with respect to the tuning fork, it will take more than a quarter of a revolution for the segment 10 to make contact with the brush 12 after the arm 13 of the tuning fork closes the contact $m$. The two intervals during which the shortcircuit is opened will, therefore, be longer and the two intervals during which it is closed will, therefore, be shorter during each revolution, thereby rendering the effective resistance of the element R in the field circuit less than half its normal value. In the limiting case, after the arm 13 closes the contact $m$, it will take just a half-revolution for the segment 10 to make contact with the brush 12 and at this precise instant, the arm 13 will be shifted to the contact $v$, so that the shortcircuit will, in effect, be open during the entire revolution of the commutator. This, of course, tends to speed up the motor.

It will be obvious that the general principles herein disclosed may be embodied in many other organizations widely different from those illustrated without departing from the spirit of the invention as defined in the following claims.

What is claimed is:

1. A motor regulating arrangement comprising a motor to be regulated, a circuit interrupting commutator driven thereby, a steadily vibrating circuit interrupter whose speed of interruption is independent of said motor, and a circuit extending serially through the contacts of said interrupters for controlling the electrical constants of said motor, the relative lengths of times that said circuit is opened and closed depending upon the synchronism between said interrupters.

2. An arrangement for maintaining constant the frequency of a motor generator set, which comprises a circuit interrupting commutator driven by a movable element of said set, a steadily vibrating circuit interrupter whose frequency of vibration is independent of said set, a circuit extending serially through the contacts of said interrupters for controlling the electrical constants of the motor of said set, the relative lengths of the times of opening and closing of said circuit depending upon the synchronism between said interrupters.

3. A motor regulating arrangement comprising a motor to be regulated, a tuning fork having a speed of vibration bearing a fixed relation to the speed of said motor when said motor is running at a desired speed, a circuit controller operated by said tuning fork, a commutator driven by said motor, and a circuit extending serially through the contacts of said commutator and said circuit controller for controlling the electrical constants of said motor, the relative lengths of the periods during which said circuit is opened and closed depending upon the synchronism between said commutator and said tuning fork.

4. An arrangement for maintaining constant the frequency of a motor generator set comprising a tuning fork vibrating at a frequency bearing a definite relationship to the frequency generated by said set when said motor is running at a desired speed, a circuit controller operated by said tuning fork, a commutator driving a movable element of said set, and a circuit extending serially through the contacts of said commutator and said circuit controller for controlling the electrical constants of said motor, the relative lengths of the times during which said circuit is opened and closed depending upon the synchronism between said commutator and said tuning fork.

In testimony whereof, I have signed by name to this specification this 4th day of September 1923.

JOSEPH HERMAN.